Feb. 1, 1938.   E. L. HARDER ET AL   2,106,844
RAILWAY CONTROL SYSTEM
Filed Aug. 8, 1934
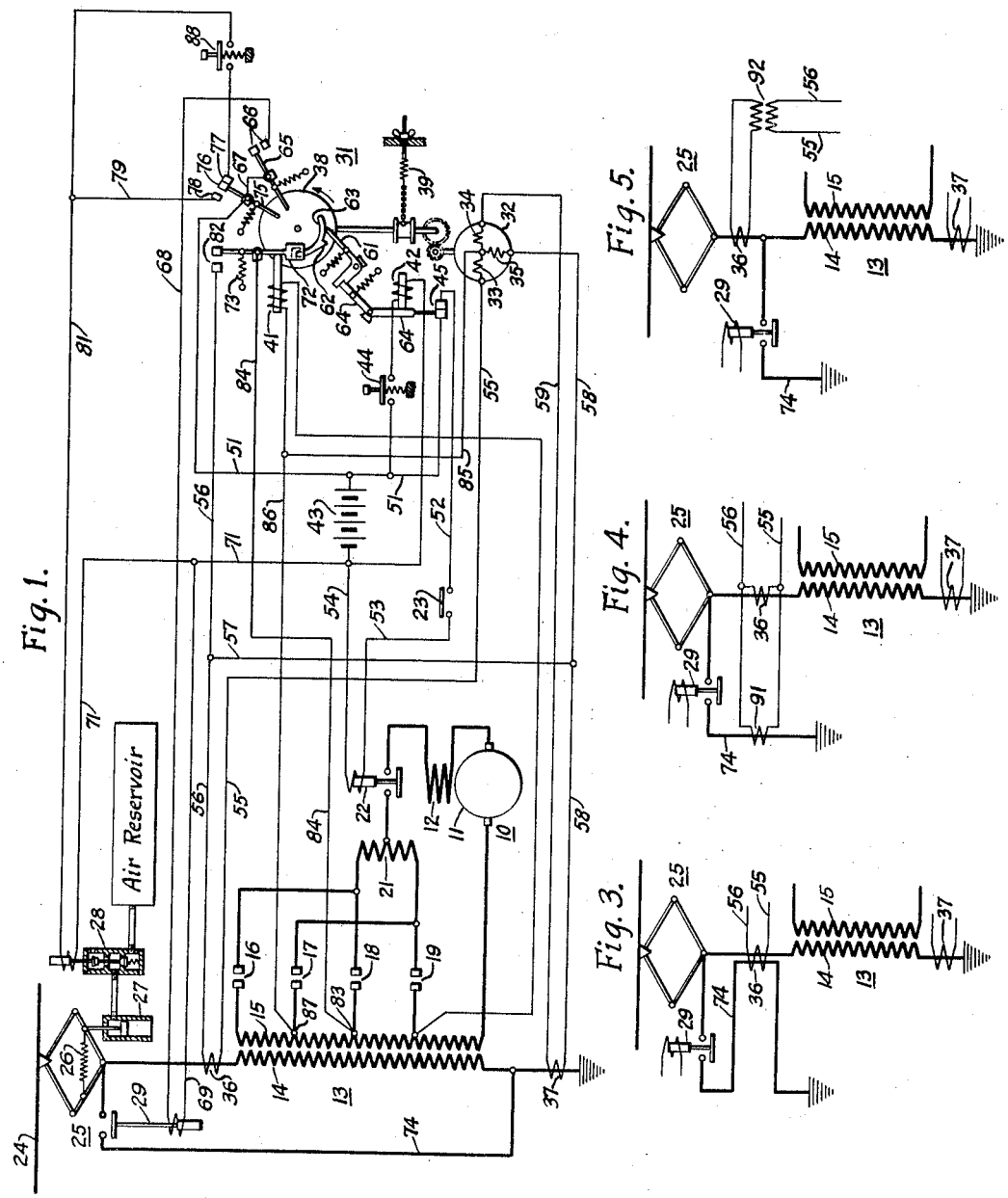
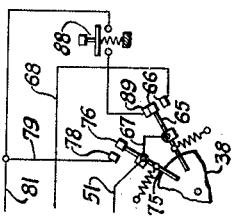
WITNESSES:
Leon J. Taga
N. E. Elliott
INVENTORS
Edwin L. Harder, Lloyd J. Hibbard,
and William R. Taliaferro.
BY
ATTORNEY Patented Feb. 1, 1938

2,106,844

UNITED STATES PATENT OFFICE 2,106,844

RAILWAY CONTROL SYSTEM

Edwin L. Harder and Lloyd J. Hibbard, Forest Hills, and William R. Taliaferro, Pittsburgh, Pa., assignors to Westinghouse Electric & Manufacturing Company, East Pittsburgh, Pa., a corporation of Pennsylvania Application August 8, 1934, Serial No. 738,978

5 Claims. (Cl. 191—8)

Our invention relates, generally, to railway control systems, and more particularly, to systems for protecting the equipment installed on electric railway locomotives.

In view of the limited space on electric locomotives, circuit breakers are usually provided in substations, which are located at intervals along the railway system, for the purpose of protecting the electrical apparatus in case of heavy overload or short circuit conditions. The trolley feeder system is divided into sections and when a fault occurs on the system, the circuit breakers in the nearest substations are opened, thereby isolating the section in which the fault is located.

Since all service is interrupted over the entire section when the substation breakers are opened, it is desirable to remove the fault condition as quickly as possible either by disconnecting the particular apparatus on the locomotive in which the fault has occurred, or by disconnecting the complete locomotive from the trolley conductor by lowering the pantograph collector, in order that the substation breakers may be reclosed to restore power to the system.

However, the pantograph collector should not be disconnected from the trolley conductor while an abnormal current is flowing, as an arc would be established which would be injurious to both the pantograph and the trolley conductor. It is also desirable to avoid lowering the pantograph in case the fault can be cleared by disconnecting certain apparatus on the locomotive as, for example, the auxiliary motors, or in the event of momentary surges of current, such as transformer magnetizing transients caused by a bouncing pantograph, in which case the overload condition is of a short duration.

An object of our invention, generally stated, is to provide a system for protecting the electrical equipment on a locomotive which shall be simple and efficient in operation and which may be economically manufactured and installed.

A more specific object of our invention is to provide a relay system for protecting the apparatus on an electric locomotive which shall not be operated by transformer magnetizing transients to disconnect the locomotive from the power source.

Another object of our invention is to provide a protective relay system for automatically controlling the operation of a pantograph collector which shall prevent the pantograph from being lowered while it is conducting an abnormal current.

A further object of our invention is to provide for grounding the pantograph to cause the substation circuit breakers to be opened in the event of a continued overload condition in the apparatus on a locomotive.

Other objects of our invention will be explained fully hereinafter or will be apparent to those skilled in the art.

For a fuller understanding of the nature and objects of our invention, reference may be had to the following detailed description, taken in conjunction with the accompanying drawing, in which:

Figure 1 is a diagrammatic view of a protective relay system embodying our invention;

Fig. 2 is a view, showing a modified form of a portion of the system shown in Fig. 1; and Figs. 3, 4 and 5 are views, showing modifications of another portion of the system shown in Fig. 1.

Referring to the drawing, and particularly to Fig. 1, the system shown comprises a motor 10, which may be of a type suitable for propelling an electric locomotive (not shown). The motor 10 is provided with an armature winding 11 and a series field winding 12. In order to simplify the drawing and description, only one motor has been shown; however, it will be understood that additional motors may be readily provided for propelling the locomotive and also for operating auxiliary apparatus, such as blowers and compressors.

The power for operating the motor 10 is supplied through a transformer 13, having a primary winding 14 and a secondary winding 15. In accordance with the usual practice, a plurality of tap-changing switches 16 to 19, inclusive, and a preventive coil 21 are provided for varying the voltage applied to the motor 10. The tap-changing switches 16 to 19 may be operated by means of a master controller (not shown) in a manner well known in the art. An electrically operated line switch 22 is provided for connecting the motor 10 to the preventive coil 21. The operation of the line switch 22 may be manually controlled by means of a contact segment 23 which may be located on the master controller.

The primary winding 14 of the transformer 13 is connected to a power conductor 24 by means of a pantograph collector 25 which is provided with a spring 26 for raising the pantograph and an air-operated device 27 for lowering the pantograph frame. The admission of air to the device 27 for lowering the pantograph is controlled by a magnet valve 28 of a standard type.

In order to shunt the electrical apparatus on the locomotive in case of a fault in the apparatus or continued overload, thereby causing the circuit breakers in the substation to open as will be explained more fully hereinafter, a switch 29 is provided for grounding the pantograph 25.

As shown, the grounding switch 29 and pantograph lowering device 27 are both controlled by a pantograph relay 31 whose function is to protect the locomotive against faults resulting in short circuits or grounds in either the high voltage or low voltage circuits.

The relay 31 comprises a motor element 32 having two coils 33 and 34 which act as an overload element and a coil 35 which acts as a differential element. The coils 33 and 34 are connected in series with two current transformers 36 and 37, the current transformer 36 being in the pantograph lead and the transformer 37 being in the ground lead of the primary winding 14 of the power transformer 13.

Therefore, the coils 33 and 34 are energized by a current proportional to the total current flowing through the transformer 13, and the coil 35 is energized by a current proportional to the difference between the current entering and the current leaving the primary winding 14. The motor element 32 is geared to a rotatable contact plate 38 and the motor torque is opposed by an adjustable spring 39. The contact mechanism is so disposed that certain circuits are closed and others are opened in a predetermined sequence, both as the contact plate 38 is advanced by the motor 32 and retracted by the spring 39. A holding or latching coil 41, which is energized from the secondary winding 15 of the transformer 13, actuates a latching mechanism for retaining the contact plate 38 in its normal reset position and a reset coil 42, which may be energized from a battery 43 by closing a push button switch 44, is provided for resetting one pair of contact members 45 on the relay after they have once been operated by the contact mechanism.

In order that the functioning of the foregoing apparatus may be more clearly understood, the operation of the relay protective system will now be described in detail.

It is assumed that the contact segment 23 on the master controller has been closed to energize the actuating coil of the line switch 22 through a circuit which extends from a positive terminal of the battery 43 through conductor 51, contact members 45 on the relay 31, conductor 52, the contact segment 23, conductor 53, the actuating coil of the switch 22 and conductor 54 to the negative terminal of the battery 43, and also that certain of the tap-changing switches 16 to 19, inclusive, have been closed to apply a predetermined voltage to the motor 10.

If an overload or short circuit condition develops in the motor 10, an abnormal current will flow through both of the current transformers 36 and 37, thereby energizing the overload windings 33 and 34, on the motor element 32 of the relay 31, through a circuit which may be traced from one terminal of the winding 33 through conductor 55, the current transformer 36, conductors 56, 57 and 58, the current transformer 37, conductor 59, and thence through the windings 34 and 33 on the motor element 32 of the relay 31. When the overload current exceeds a predetermined value, the motor element 32 develops sufficient torque to overcome the force of the spring 39 and rotate the contact plate 38 in the direction indicated by the arrow.

Within a comparatively short time after the contact plate 38 starts to rotate, a lever 61 is engaged by a projection 62 on a tripping dog or cam 63, thereby releasing a contact lever 64 and opening the contact members 45. However, the time required for the projection 62 to travel the distance necessary for engaging the lever 61 is sufficient to prevent magnetizing transients of short duration from causing the contact members 45 to be opened. The opening of the contact members 45 interrupts the energizing circuit through the actuating coil of the line switch 22, thereby permitting this switch to open and disconnect the motor 10 from the transformer 13. If the fault is cleared by disconnecting the motor 10, the overload condition is removed and the contact plate 38 will be retracted to its normal reset position by the action of the spring 39. The contact lever 64 may be reset to close the contact members 45 by closing the push button switch 44 to energize the reset coil 42 from the battery 43. When the cause of the trouble in the motor circuits has been removed, the motor may be again connected to the power source in the usual manner.

It will thus be seen that the fault has been cleared by disconnecting the motor 10 from the power source and that in the foregoing condition it was not necessary to operate the grounding switch 29 or lower the pantograph 25. However, if a ground occurs in the windings of the power transformer 13 or in the connected bus bars and tap-changing switches 16 to 19, inclusive, or in the preventive coil 21, a torque is developed in the motor element 32 of the relay 31 by the energization of the differential coil 35 as a result of the unbalanced condition in the current flowing through the current transformers 36 and 37. Accordingly, the contact plate 38 is rotated by the motor element 32 and the contact members 45 will be opened as previously described.

However, the opening of the line switch 22 does not remove the fault, therefore the contact plate 38 continues to rotate until the tripping cam 63 engages a lever 65 to close a set of contact members 66, thereby energizing the actuating coil of the grounding switch 29, which closes to ground the pantograph collector 25. The energizing circuit for the actuating coil of the grounding switch 29 may be traced from the positive terminal of the battery 43 through conductors 51 and 67, contact members 66, conductor 68, the actuating coil of the switch 29, and conductors 69 and 71 to the negative terminal of the battery 43.

The closing of the grounding switch 29 shunts the transformer 13 and removes the voltage from the transformer, thereby deenergizing the holding coil 41 of relay 31 which permits a latching mechanism 72 to be actuated by a spring 73 to a position in which the latch 72 is clear of the cam 63 on the contact plate 38, thereby permitting the cam to pass the latch when the contact plate is retracted. However, it will be noted that the grounding lead 74 is so connected that the ground current flows through the current transformer 37, thereby maintaining a torque on the relay 31 which prevents the contact plate 38 from being retracted until the substation breakers have opened to deenergize the trolley conductor 24.

When the substation breakers open, energy is removed from the relay 31 and the contact plate 38 is retracted by the spring 39. Since the latch 72 has been actuated to a position which permits the cam 63 to pass the latch, the contact plate 38 is retracted until the cam 63 engages a lever 75 which causes a contact member 76 to disengage a contact member 77 and engage a contact 78, thereby energizing the actuating coil of the magnet valve 28 to admit air to the pantograph lowering device 27 which lowers the pantograph 25. The energizing circuit for the actuating coil of the magnet valve 28 may be traced from the positive terminal of the battery 43 through conductor 51, contact members 76 and 78, conductors 79 and 81, the coil of the magnet valve 28 and conductor 71 to the negative terminal of the battery 43.

It will thus be seen that it is impossible for the relay 31 to operate to lower the pantograph 25, while the substation breakers are closed and an abnormal current is flowing through the pantograph, since, as previously described, the ground lead 74 is so connected that the ground current energizes the current transformer 37, thereby causing the motor element of the relay 32 to remain energized until power is removed from the trolley conductor 24. Grounding a pantograph in the manner herein illustrated accordingly permits sufficient current to flow through the grounding connection to cause the substation breakers to open and also prevents the pantograph collector from being disconnected from the trolley conductor until after power has been removed from the conductor, thereby preventing injury to the pantograph and conductor, which would result if the pantograph should be lowered while conducting a heavy current.

If momentary surges of current, such as transformer magnetizing transients, are produced as the result of a bouncing pantograph, in which case the pantograph alternately makes and breaks contact with the trolley conductor when the locomotive is travelling at high speeds, a succession of such surges may cause the relay 31 to retract beyond the normal reset position in which the latch 72 engages the cam 63. It will be understood that when the pantograph leaves the conductor 24, voltage is removed from the transformer 13 and, accordingly, the holding coil 41 is deenergized, which permits the latch 72 to drop.

However, it is undesirable to permit the relay 31 to continue to retract to operate the lever 75 to lower the pantograph in case voltage is restored at any time before the relay has reached its fully retracted position. Therefore, provision is made for energizing the differential coil 35, of the motor element 32, by connecting it across a section of the transformer winding 15 through contact members 82, on the relay 31, which are closed when the holding coil 41 is deenergized.

The circuit which is established through the differential coil 35 by the closing of the contact members 82 may be traced from a terminal 83 on the secondary winding 15 of the transformer 13 through conductor 84, contact members 82, conductors 56, 57 and 58, the differential coil 35 and conductors 85 and 86 to a terminal 87 on the transformer winding 15. In this manner, a voltage is applied to the coil 35 in the event that voltage is restored on the transformer 13 after the end of the cam 63 has passed the latch 72 and before the cam 63 has engaged the lever 75 to cause the pantograph 25 to be lowered.

It will be noted that the coil 41 will actuate the latch 72 to engage the cam 63 in case voltage is restored before the cam passes the latch. By so constructing the latch 72 that it will strike the face of the cam 63 to prevent the latch from being returned to its normal position by the energization of the coil 41 after the end of the cam has passed the latch until the contact plate 38 has been returned to its normal reset position by the motor 32, the contact members 82 are kept closed to maintain a voltage on the coil 35 while the relay is being reset.

In the foregoing manner, a return of voltage on the transformer 13 at any time before the pantograph starts to lower energizes the differential coil 35 of the motor 32 to cause the relay 31 to motor back to its normal position and automatically reset. However, in the event that the relay 31 reaches its fully retracted position and the pantograph is once lowered, it is necessary for the operator to manually reset the relay.

A push button switch 88 is provided for energizing the actuating coil of the magnet valve 28, thereby permitting the operator to lower the pantograph. If desired, the push button switch may be connected in the manner shown in Fig. 2, in which case manual control of the pantograph is removed by the operation of the contact arm 65 to disengage the contact member 66 from a contact member 89 when the relay 31 operates to cause the closing of the grounding switch 29. In this manner, it is made impossible for the operator of the locomotive to lower the pantograph until after the substation breakers have opened to remove energy from the motor 32 of the relay 31, which permits the relay to be retracted in the manner described hereinbefore.

In the modifications illustrated in Figs. 3, 4 and 5, different schemes are shown for accomplishing the same result as is accomplished in the system illustrated in Fig. 1 by causing the ground current flowing through the conductor 74 to energize the current transformer 37. In the scheme shown in Fig. 3, it will be seen that the ground current energizes the current transformer 36, which will, of course, energize the differential winding 35 of the motor element 32 in the same manner as by causing the ground current to flow through the transformer 37, as illustrated in Fig. 1.

In the modification shown in Fig. 4, an additional current transformer 91, which is energized by the current flowing through the ground lead 74, is connected in parallel with the current transformer 36, thereby energizing the differential winding 35 of the motor element 32.

If desired, an insulating transformer 92 may be interposed between the current transformer 36 and the motor element 32 of the relay 31, as shown in Fig. 5, to afford protection against the high voltage of the main power system. It will be understood that the transformer 92 may be located on the roof of the locomotive, thereby protecting the apparatus in the locomotive from injury in case of a breakdown in the insulation of the current transformer 36.

It will be seen that any one of the schemes shown in Figs. 3, 4 and 5 may be incorporated in the differential protective scheme shown in Fig. 1, and may be utilized to prevent the relay 31 from operating to lower the pantograph 25, while current is flowing through the ground connection 74, as explained hereinbefore.

From the foregoing description, it will be understood that protection is afforded on the occurrence of fault conditions. If the fault is cleared by disconnecting certain of the apparatus on the locomotive, the grounding switch is not operated and the substation breakers are not opened, which prevents the unnecessary removal of power from the entire feeder section of the power system. It is only when the fault condition cannot be cleared on the locomotive that the grounding switch is operated and the pantograph lowered, and in no case is the pantograph lowered while it is conducting an abnormal current.

It will also be seen that only under extreme conditions will the relay be operated by momentary surges of current, which may be produced by a bouncing pantograph or other abnormal conditions, to lower the pantograph, since this is prevented by the provision for restoring energy to the motor element of the relay in the event that voltage is restored on the power transformer by the pantograph reengaging the conductor at any time before the lowering mechanism is energized.

We do not desire to be restricted to the particular form or arrangement of parts herein shown and described, since it is evident that they may be changed and modified without departing from the spirit and scope of our invention as defined in the appended claims.

We claim as our invention:

1. In a protective relay system, in combination, electrical apparatus, a pantograph collector for connecting said apparatus to a power conductor, means for grounding the pantograph, means for lowering the pantograph to disconnect the apparatus from the power conductor, relay means responsive to abnormal current conditions in said apparatus for causing the operation of said grounding means and said pantograph lowering means in sequential relation, and contact members associated with said relay and disposed to energize the operating element of the relay to automatically reset the relay under predetermined conditions.

2. In a protective relay system, in combination, electrical apparatus, a pantograph collector for connecting said apparatus to a power conductor, means for grounding the pantograph, means for lowering the pantograph to disconnect the apparatus from the power conductor, relay means responsive to abnormal current conditions in said apparatus for causing the operation of said grounding means and said pantograph lowering means in sequential relation, contact members associated with said relay and disposed to energize the operating element of the relay to automatically reset the relay under predetermined conditions, and mechanical interlocking means on said relay for preventing said contact members from being actuated to deenergize the operating element until the relay is returned to its normal position.

3. In a protective relay system, in combination, electrical apparatus, a pantograph collector for connecting said apparatus to a power conductor, means for grounding the pantograph, means for lowering the pantograph to disconnect the apparatus from the power conductor, relay means responsive to abnormal current conditions in said apparatus for causing the operation of said grounding means and said pantograph lowering means in sequential relation, manually-operable means for controlling the operation of said pantograph lowering means, and means associated with said relay means for causing said manual means to be ineffective while current is flowing through said grounding means.

4. In a protective relay system, in combination, electrical apparatus, a current collector for connecting said apparatus to a power conductor, means for grounding the collector, means for lowering the collector to disconnect the apparatus from the power conductor, relay means having an operating motor element responsive to abnormal current conditions in said apparatus for causing the operation of said grounding means and said collector lowering means in sequential relation, and means associated with said relay means and responsive to voltage conditions in said apparatus for causing the operating motor element of the relay to be energized to automatically reset the relay under predetermined conditions.

5. In a protective relay system, in combination, electrical apparatus, a current collector for connecting said apparatus to a power conductor, means for grounding the collector, means for lowering the collector to disconnect the apparatus from the power conductor, relay means having an operating motor element responsive to abnormal current conditions in said apparatus for causing the operation of said grounding means and said collector lowering means in sequential relation, and means associated with said relay means and responsive to voltage conditions in said apparatus for applying a potential from said apparatus to the operating motor element of the relay to automatically reset the relay under predetermined conditions.

EDWIN L. HARDER.
LLOYD J. HIBBARD.
WILLIAM R. TALIAFERRO.